United States Patent [19]

Lauwerijssen et al.

[11] Patent Number: 5,669,510
[45] Date of Patent: Sep. 23, 1997

[54] METHOD AND DEVICE FOR SELECTING LOW-PRESSURE MURCURY DISCHARGE LAMPS

[75] Inventors: Petrus C. Lauwerijssen, Roosendaal; Johannes T. W. De Hair, Eindhoven; Lukas Kastelein, Roosendaal; Henricus C. G. Verhaar, Eindhoven, all of Netherlands

[73] Assignee: U.S. Phillips Corporation, New York, N.Y.

[21] Appl. No.: 607,959

[22] Filed: Feb. 29, 1996

[30] Foreign Application Priority Data

Mar. 10, 1995 [EP] European Pat. Off. .............. 95200589

[51] Int. Cl.$^6$ ...................................................... B07C 5/00
[52] U.S. Cl. .......................... 209/578; 209/582; 209/587
[58] Field of Search .................................. 209/576–578, 209/580–582, 587

[56] References Cited

U.S. PATENT DOCUMENTS

| | | | |
|---|---|---|---|
| 3,305,089 | 2/1967 | Fraenker | 209/578 X |
| 3,650,400 | 3/1972 | Warren | 209/578 X |
| 4,435,284 | 3/1984 | Heytmeijer | 209/3 |
| 4,759,630 | 7/1988 | Yuasa et al. | 209/577 X |
| 5,190,163 | 3/1993 | Anzai et al. | 209/582 X |

FOREIGN PATENT DOCUMENTS

3911395C1  5/1980  Germany ................ B09B 3/00

*Primary Examiner*—Boris Milef
*Attorney, Agent, or Firm*—Brian J. Wieghaus; Walter M. Egbert, III

[57] ABSTRACT

A method of selecting low-pressure mercury discharge lamps comprising a luminescent layer, the luminescent layer being excited and the low-pressure mercury discharge lamps being selected in dependence on the emission spectrum of the visible light emitted by the luminescent layer. The luminescent layer is excited by a light source arranged outside the low-pressure mercury discharge lamp and which generates ultraviolet radiation having a wavelength above 300 nm. This makes it possible to use the presence of a blue-luminescent substance in the luminescent layer as a selection criterion for both leaky and intact low-pressure mercury discharge lamps.

6 Claims, 1 Drawing Sheet

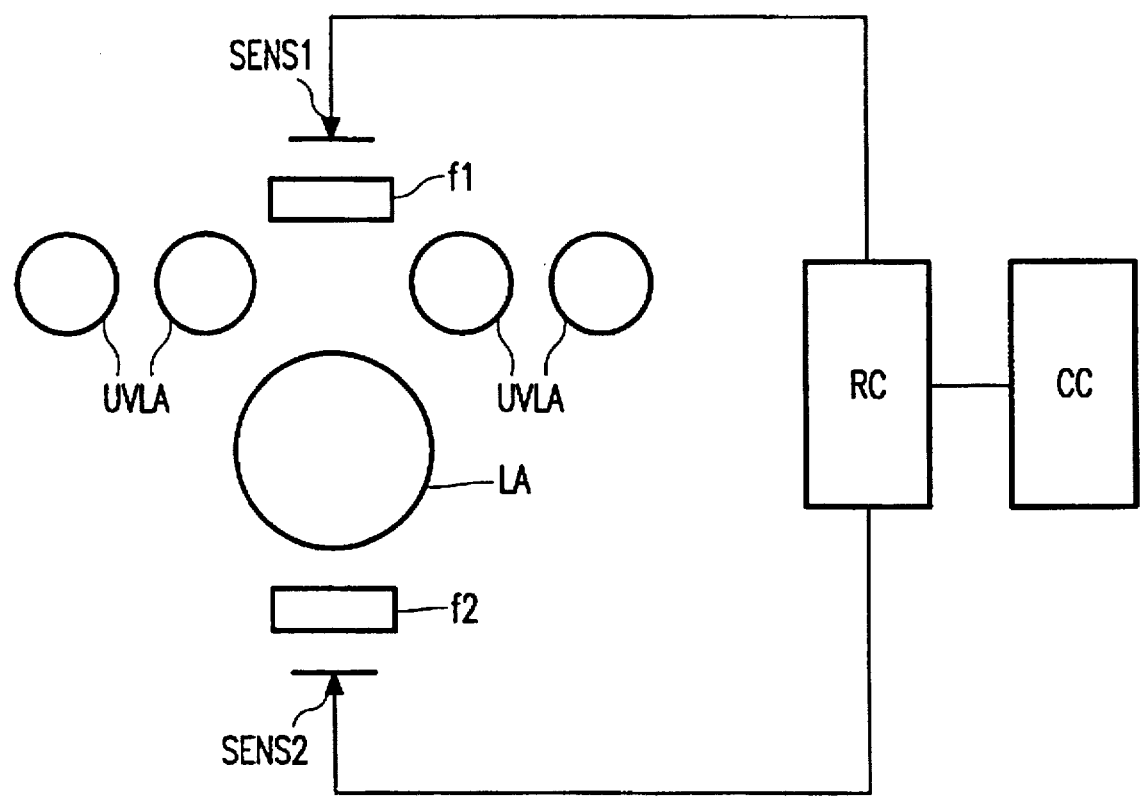

METHOD AND DEVICE FOR SELECTING LOW-PRESSURE MURCURY DISCHARGE LAMPS

The invention relates to a method of selecting low-pressure mercury discharge lamps comprising a discharge vessel which is provided with a luminescent layer on an inside surface, said luminescent layer being excited and the low-pressure mercury discharge lamps being selected in dependence on the emission spectrum of the light emitted by the luminescent layer. The invention also relates to a device for selecting low-pressure mercury discharge lamps comprising a discharge vessel which is provided with a luminescent layer on an inside surface, said device being provided with an excitation source for exciting the luminescent layer of the low-pressure mercury discharge lamps to be selected and with detection means for detecting the light emitted by the low-pressure mercury discharge lamps to be selected.

A method of the type mentioned in the opening paragraph is known from German Patent Specification DE 3911395 C1. Such a method usually forms part of a process for recycling low-pressure mercury discharge lamps. Such a process frequently includes a process step in which the luminescent layers of low-pressure mercury discharge lamps are removed from the lamp vessel and collected, whereafter they are subjected to a number of further process steps to make them suitable for re-use. In low-pressure mercury discharge lamps, however, very diverse mixtures of luminescent materials are used in the luminescent layer. A mixture of very diverse compositions of the luminescent layer is unsuitable for re-use. In addition, the further process steps necessary to make the luminescent layer suitable for re-use are not identical for every luminescent-layer composition. For these reasons, it is usually impossible to make the luminescent-layer materials, which originate from various types of low-pressure mercury discharge lamps and which are manufactured by various manufacturers, jointly suitable for re-use. Recycling each luminescent-layer composition separately would lead, however, to a too complicated recycling process. For this reason, it is desirable to divide the collected luminescent-layer materials into a limited number of groups, so that each group can be made suitable for re-use by means of specific further process steps. In this connection, it is required that the composition of the recycled mixture resulting from the recycling of a specific group can be made suitable again for use in different types of low-pressure mercury discharge lamps in a simple manner, for example by adding one or more luminescent substances. Since every composition of the luminescent layer of a low-pressure mercury discharge lamp corresponds to a characteristic emission spectrum, this composition can be identified by measuring the emission spectrum of the low-pressure mercury discharge lamp. The necessary excitation of the luminescent layer can be realized by igniting the low-pressure mercury discharge lamp. In practice, however, a substantial number of the low-pressure mercury discharge lamps to be recycled is found to be leaking. As a result, the plasma composition has often changed drastically and a discharge cannot be brought about in this changed plasma. In addition, it is relatively complicated to measure the entire emission spectrum of a low-pressure mercury discharge lamp, and said measuring process is often superfluous because, as indicated in the foregoing, it is not necessary to separate every luminescent-layer composition from all the others and make it separately suitable for re-use.

It is an object of the invention to provide a method and a device for selecting low-pressure mercury discharge lamps, in which the luminescent layer can also be excited when the low-pressure mercury discharge lamps are leaking, and in which the luminescent material can be collected and divided into a number of groups by means of relatively simple selection criteria, so that the mixture of luminescent materials forming one specific group can be recycled by means of specific further process steps which are attuned to the composition of said group.

To this end, a method of the type described in the opening paragraph is characterized in accordance with the invention in that the luminescent layer is excited by ultraviolet radiation having a wavelength above 300 nm, which ultraviolet radiation is directed to the discharge vessel from outside the low-pressure mercury discharge lamp, and in that the intensity of the light emitted by the luminescent layer in a predetermined wavelength range is used as a selection criterion.

Correspondingly, a device as described in the opening paragraph is characterized in accordance with the invention in that the excitation source is a radiation source which is arranged outside the low-pressure mercury discharge lamps to be selected, which radiation source generates ultraviolet radiation having a wavelength above 300 nm, and in that the detection means comprise means M1 for measuring the intensity, in a predetermined wavelength range, of the light emitted by the luminescent layer of the low-pressure mercury discharge lamps to be selected.

The discharge vessel of a low-pressure mercury discharge lamp is usually made of glass. The luminescent layer of a large proportion of the low-pressure mercury lamps to be recycled comprises a luminescent substance which can be excited by ultraviolet radiation having a wavelength above 300 nm, such as red-luminescent magnesium germanate activated with divalent manganese, blue-luminescent substances activated with divalent europium or green-luminescent substances activated with divalent europium and divalent manganese. Excitation of the luminescent layer by directing ultraviolet radiation having a wavelength above 300 nm to the lamp vessel from outside the low-pressure mercury discharge lamp enables very diverse luminescent-layer compositions of low-pressure mercury discharge lamps to be excited without bringing about a discharge in the low-pressure mercury discharge lamp. The ultraviolet radiation used, which has a wavelength above 300 nm, is absorbed hardly if at all by the glass wall of the discharge vessel. Thus, the luminescent layer of both leaky and intact low-pressure mercury discharge lamps can be excited. If, for example, a low-pressure mercury discharge lamp comprises a blue-luminescent substance which is activated with divalent europium, the ultraviolet radiation having a wavelength above 300 nm excites this blue-luminescent substance. As a result, a luminescent layer comprising such a blue-luminescent substance generates blue light upon excitation by ultraviolet radiation having a wavelength above 300 nm. By measuring the intensity of this blue light in a predetermined region of the spectrum, a simple selection criterion is obtained which can be used to separate low-pressure mercury discharge lamps whose luminescent layer comprises a blue-luminescent substance activated with divalent europium, from other low-pressure mercury discharge lamps. In practice this means that approximately 35% of the low-pressure mercury discharge lamps to be recycled can be separated from the other low-pressure mercury discharge lamps by means of this simple selection criterion. The intensity of the blue light in a predetermined wavelength range can be measured, for example, by means of an optical filter and an optical sensor. In the case of low-pressure mercury discharge lamps comprising the same blue-luminescent substance activated with divalent europium, the intensity of the blue light within a predetermined region of the spectrum also serves as a measure of the quantity of blue-luminescent substance in the luminescent layer. In addition to said blue-luminescent substance, these luminescent layers usually comprise a red-luminescent substance and a green-luminescent substance; and low-pressure mercury discharge lamps having different color points are obtained as a result of the fact that the ratios between the luminescent substances (red, green and blue) in the luminescent layer are different. A method in accordance with the invention enables the luminescent layers of such low-pressure mercury discharge lamps to be combined in one group, which can subsequently be recycled as a group by means of further process steps. By adding luminescent substances to the recycled mixture, luminescent-layer compositions can be obtained in which the ratio between the quantities of the luminescent substances in the layer is suitable for use in low-pressure mercury discharge lamps of a specific color point and a specific color rendering.

If the low-pressure mercury discharge lamps to be selected differ in type or originate from various manufacturers, the luminescent layers usually contain different divalent europium-containing blue-luminescent substances. For example, the blue-luminescent substance used in a low-pressure mercury discharge lamp having a color rendering index Ra,8 above 90 will usually differ from the blue-luminescent substance used in low-pressure mercury discharge lamps having a color rendering index between 80 and 90. Upon excitation, these different blue-luminescent substances exhibit emission bands having emission maxima at different wavelengths. If the ratio between the intensities of the light emitted by the luminescent layer in different predetermined wavelength ranges is used as a selection criterion, it is possible to distinguish between these different blue-luminescent substances. It is also possible to determine the quantity of the relevant blue-luminescent substance in the low-pressure mercury discharge lamps by means of the intensity measured in one of the various wavelength ranges, and to use this data for further selection. In the manner described hereinabove, low-pressure mercury discharge lamps (having, for example, different color points) whose luminescent layers contain one specific blue-luminescent substance can be collected in one specific group and recycled by means of further process steps. Of course, it is also possible to select low-pressure mercury discharge lamps of which the blue-luminescent substance belongs to a limited group of blue-luminescent substances. In practice, a specific blue-luminescent substance is usually found only in a limited number of compositions of the luminescent layer of low-pressure mercury discharge lamps. By virtue thereof, recyclable groups and recycled mixtures, which are each composed of only a relatively small number of luminescent substances, can often be obtained by selecting the low-pressure mercury discharge lamps to be recycled exclusively on the basis of the blue-luminescent substance.

These and other aspects of the invention will be apparent from and elucidated with reference to the embodiments described hereinafter.

In the drawings:

FIG. 1 schematically shows an exemplary embodiment of a device in accordance with the invention.

In FIG. 1, La is a low-pressure mercury discharge lamp to be recycled which comprises a glass lamp vessel and a luminescent layer. UVLa are lamps which generate ultraviolet light having a wavelength above 300 nm. The symbols f1 and f2 represent optical filters and SENS1 and SENS2 are sensors for measuring the intensity of the light generated by the luminescent layer of the low-pressure mercury discharge lamp La within a wavelength range which is determined by the filters f1 and f2. The sensors SENS1 and SENS2 are connected to respective inputs of a circuit potion RC for determining the ratio between a signal measured by sensor SENS1 and sensor SENS2. An output of circuit portion RC is connected to an input of control circuit CC. The filter f1 and the sensor SENS1 as well as the filter f2 and the sensor SENS2 form means M1 for determining the intensity of the light emitted by the luminescent layer in a predetermined wavelength range. The filters f1 and f2, the sensors SENS1 and SENS2 and the circuit portion RC together form means M2 for determining the ratio between the intensities of the light emitted by the luminescent layer in different wavelength ranges.

The device shown in FIG. 1 operates in the following manner.

During operation of the device, the lamps UVLa generate ultraviolet radiation having a wavelength above 300 nm. If the luminescent layer of the lamp La contains a blue-luminescent substance which is activated with divalent europium, this blue-luminescent substance is excited by the ultraviolet light, so that the low-pressure mercury discharge lamp La emits blue light. This blue light is filtered by the filters f1 and f2 and the intensity within the wavelength ranges determined by these filters are measured by the sensors SENS1 and SENS2. The circuit portion RC determines the ratio between the intensities measured by the sensors SENS1 and SENS2. The control circuit CC determines, in dependence on said ratio, to which group to be recycled the luminescent layer of the low-pressure mercury discharge lamp La will be added. This addition is effected by means, not shown in FIG. 1, whose operation is controlled by the control circuit CC.

Table I lists, in relative units, the intensities of the light emitted by low-pressure mercury lamps in two wavelength ranges in dependence on the composition of the luminescent layer, if said luminescent layer was excited by means of a light source which is arranged outside the low-pressure mercury discharge lamp and which generates ultraviolet radiation having a wavelength above 300 nm. The low-pressure mercury lamps were of the TL-D type with a length of approximately 120 cm and a diameter of approximately 26 mm. In the first column of the Table is listed the type and the quantity of the blue-luminescent substance contained in the luminescent layer of the low-pressure mercury discharge lamps. In said first column, the abbreviation BAM stands for barium magnesium aluminate activated with divalent europium, and the abbreviation SAE stands for strontium aluminate activated with divalent europium. The second column lists the color temperature of the light emitted by the low-pressure mercury discharge lamp during stationary lamp operation. The color rendering index R(a,8) of low-pressure mercury discharge lamps whose luminescent layer contains BAM ranges between 80 and 90. The color rendering index R(a,8) of low-pressure mercury discharge lamps whose luminescent layer contains SAE is above 90. The third column lists, in relative units, the intensity I1 of the light emitted by the low-pressure mercury discharge lamp in a first wavelength range upon excitation of the luminescent layer by means of ultraviolet radiation having a wavelength above 300 nm. This intensity is measured by means of a first optical sensor comprising a photodiode and a first optical band filter having a maximum transparency for light having a wavelength of approximately 450 nm and a half-value width of approximately 10 nm. The fourth column lists, in a corresponding manner, the intensity I2 of the light emitted by the low-pressure mercury discharge lamp in a second wavelength range upon excitation of the luminescent layer by means of ultraviolet radiation having a wavelength above 300 nm. The intensity in this second wavelength range was measured by means of a second optical sensor and a second optical filter. Said second optical filter has a maximum transparency for light having a wavelength of approximately 438 nm and a half-value width of approximately 10 nm.

As is shown in the first column of the Table, measurements carried out on a low-pressure mercury discharge lamp which does not contain a luminescent substance, reveal that the intensity in both wavelength ranges is very small. This very small intensity is caused by background radiation. In the case of the low-pressure mercury discharge lamps in the next columns, which comprise BAM as the blue-luminescent substance, much higher, substantially equal intensities in both wavelength ranges are found. The intensities increase as the quantity of BAM in the luminescent layer increases. The Table also shows that for the SAE-containing low-pressure mercury discharge lamps the intensities in the various wavelength ranges differ substantially. Also in the case of the SAE-containing low-pressure mercury discharge lamps, the intensities increase as the quantity of SAE in the luminescent layer increases. The table shows that low-pressure mercury discharge lamps comprising luminescent layers of different compositions can be selected very satisfactorily by exciting the luminescent layer by means of ultraviolet radiation having a wavelength above 300 nm and by measuring the intensity of the emitted light in different, predetermined wavelength ranges.

TABLE I

| Blue luminescent substance | Color-temperature | I1 | I2 |
| --- | --- | --- | --- |
| BAM (0 mg) | 2700 K | 0.1 | 0.1 |
| BAM (42 mg) | 3000 K | 1.0 | 1.0 |
| BAM (126 mg) | 4000 K | 2.7 | 2.7 |
| BAM (250 mg) | 5000 K | 6.6 | 6.8 |
| BAM (858 mg) | 9000 K | 15.8 | 15.7 |
| SAE (200 mg) | 2700 K | 0.4 | 0.2 |
| SAE (360 mg) | 3000 K | 0.8 | 0.3 |
| SAE (440 mg) | 3800 K | 0.9 | 0.3 |

We claim:

1. A method of selecting low-pressure mercury discharge lamps each comprising a discharge vessel provided with a luminescent layer on an inside surface thereof, said luminescent layer being excited and the low-pressure mercury discharge lamps being selected in dependence on the emission spectrum of the light emitted by the luminescent layer, said method comprising the steps of:

exciting the luminescent layer by ultraviolet radiation having a wavelength above 300 nm by directing the ultraviolet radiation to the discharge vessel from a location outside the low-pressure mercury discharge lamp, measuring the intensity of the light emitted by the luminescent layer in a predetermined wavelength range; and associating each said lamp to a particular lamp group from among a plurality of lamp groups having respectively different luminescent layer compositions on the basis of the measured light intensity of said each lamp.

2. A method as claimed in claim 1, wherein said measuring step comprises measuring a ratio between the intensities of the light emitted by the luminescent layer in various predetermined wavelength ranges.

3. A device for selecting low-pressure mercury discharge lamps each comprising a discharge vessel provided with a luminescent layer on an inside surface thereof, said device comprising:

an excitation source for exciting the luminescent layer of the low-pressure mercury discharge lamps to be selected;

detection means for detecting the light emitted by the low-pressure mercury discharge lamps to be selected, wherein the excitation source is a radiation source arranged outside the low-pressure mercury discharge lamps to be selected, said radiation source generating ultraviolet radiation having a wavelength above 300 nm, further wherein the detection means comprise means for measuring the intensity, in a predetermined wavelength range, of the light emitted by the luminescent layer of the low-pressure mercury discharge lamps to be selected; said device further comprising means for associating each said lamp to a particular lamp group from among a plurality of lamp groups having respectively different luminescent layer compositions on the basis of the measured intensity of said each lamp.

4. A device as claimed in claim 3, wherein the detection means comprises means for determining a ratio between the intensities of the light emitted by the luminescent layer in different wavelength ranges.

5. A device as claimed in claim 3, wherein the intensity measuring means comprise an optical filter and an optical sensor.

6. A device as claimed in claim 4, wherein the detection means comprise optical filters and optical sensors.

* * * * *